United States Patent
Pio

(10) Patent No.: US 9,437,254 B2
(45) Date of Patent: Sep. 6, 2016

(54) METHOD OF DYNAMICALLY SELECTING MEMORY CELL CAPACITY

(71) Applicant: Micron Technology, Inc., Boise, ID (US)

(72) Inventor: Federico Pio, Brugherio (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/728,900

(22) Filed: Jun. 2, 2015

(65) Prior Publication Data

US 2015/0262628 A1   Sep. 17, 2015

Related U.S. Application Data

(60) Continuation of application No. 14/283,117, filed on May 20, 2014, now Pat. No. 9,076,524, which is a division of application No. 13/770,881, filed on Feb. 19, 2013, now Pat. No. 8,824,213, which is a continuation of application No. 12/949,728, filed on Nov. 18, 2010, now Pat. No. 8,737,138.

(51) Int. Cl.
   *G11C 16/04*   (2006.01)
   *G11C 5/14*    (2006.01)
   *G11C 16/26*   (2006.01)
   (Continued)

(52) U.S. Cl.
   CPC ........... *G11C 5/147* (2013.01); *G06F 12/0246* (2013.01); *G06F 21/60* (2013.01); *G11C 7/109* (2013.01); *G11C 7/1078* (2013.01); *G11C 7/22* (2013.01); *G11C 14/009* (2013.01); *G11C 14/0063* (2013.01); *G11C 16/0408* (2013.01); *G11C 16/06* (2013.01); *G11C 16/107* (2013.01); *G11C 16/12* (2013.01); *G11C 16/26* (2013.01); *G11C 16/30* (2013.01);
   (Continued)

(58) Field of Classification Search
   CPC ....................................................... G11C 16/04
   USPC ..................................................... 365/185.03
   See application file for complete search history.

(56) References Cited

U.S. PATENT DOCUMENTS 5,768,287 A   6/1998   Norman et al.
6,564,288 B2  5/2003   Olarig et al.
(Continued)

FOREIGN PATENT DOCUMENTS

CN   101000794 A    7/2007
DE   103 35 060 A1  7/2004
(Continued)

OTHER PUBLICATIONS

Korean Notice of Allowance for Korean Patent Application No. 10-2014-0060276 dated Aug. 31, 2015 in 2 pages.
(Continued)

*Primary Examiner* — Son Mai
(74) *Attorney, Agent, or Firm* — Brooks, Cameron & Huebsch, PLLC

(57) ABSTRACT

A method is provided for using a multi-level cell memory device. The method includes writing first data to a first portion of a memory array using a first number of state levels for memory cells of the first portion of the memory array. The method further includes re-writing second data to a second portion of the memory array using a second number of state levels for memory cells of the second portion of the memory array. The second number is different from the first number.

19 Claims, 4 Drawing Sheets

(51) Int. Cl.
   *G11C 16/12*    (2006.01)
   *G06F 21/60*    (2013.01)
   *G11C 16/06*    (2006.01)
   *G11C 16/30*    (2006.01)
   *G11C 7/22*     (2006.01)
   *G11C 7/10*     (2006.01)
   *G11C 14/00*    (2006.01)
   *G06F 12/02*    (2006.01)
   *G11C 16/10*    (2006.01)
   *G11C 11/56*    (2006.01)

(52) U.S. Cl.
   CPC .. *G06F 2212/7204* (2013.01); *G11C 11/5621* (2013.01); *G11C 11/5671* (2013.01)

(56) References Cited

U.S. PATENT DOCUMENTS

| | | | |
|---|---|---|---|
| 6,851,018 B2 | 2/2005 | Wyatt et al. | |
| 6,862,217 B2 | 3/2005 | Kawabata | |
| 6,903,974 B2 | 6/2005 | Wooldridge | |
| 7,180,775 B2* | 2/2007 | Meir | G11C 11/5621 365/185.03 |
| 7,426,138 B1 | 9/2008 | Wong | |
| 7,539,053 B2* | 5/2009 | Kanda | G11C 11/5621 365/185.03 |
| 7,545,677 B2 | 6/2009 | Lee et al. | |
| 7,551,480 B2* | 6/2009 | Park | G11C 11/5621 365/185.11 |
| 7,551,486 B2 | 6/2009 | Cornwell et al. | |
| 7,616,483 B2 | 11/2009 | Murin | |
| 7,773,417 B2* | 8/2010 | Tsuji | G06F 12/0246 365/185.03 |
| 7,791,939 B2* | 9/2010 | Kim | G11C 11/5621 365/185.03 |
| 7,808,819 B2 | 10/2010 | Murin et al. | |
| 7,916,543 B2 | 3/2011 | Goda et al. | |
| 7,920,427 B2 | 4/2011 | Marquart | |
| 7,924,623 B2 | 4/2011 | Goda et al. | |
| 8,001,320 B2 | 8/2011 | Sokolov et al. | |
| 8,072,804 B2* | 12/2011 | Lee | G11C 11/5628 365/185.03 |
| 8,085,586 B2 | 12/2011 | Golov et al. | |
| 8,228,735 B2* | 7/2012 | Puzzilli | G11C 11/5628 365/185.14 |
| 8,243,520 B2 | 8/2012 | Chan et al. | |
| 8,902,650 B2* | 12/2014 | Goldman | G11C 11/5628 365/185.03 |
| 2008/0198651 A1* | 8/2008 | Kim | G06F 12/0246 365/185.03 |
| 2008/0263262 A1 | 10/2008 | Sokolov et al. | |
| 2009/0091979 A1 | 4/2009 | Shalvi | |
| 2009/0273977 A1 | 11/2009 | Kim et al. | |
| 2010/0142284 A1 | 6/2010 | Bathul et al. | |
| 2010/0208523 A1 | 8/2010 | Marquart | |
| 2010/0332729 A1 | 12/2010 | Alrod et al. | |
| 2011/0304874 A1 | 12/2011 | Aharonson | |
| 2012/0047320 A1 | 2/2012 | Yoo et al. | |
| 2012/0239858 A1 | 9/2012 | Melik-Martirosian | |

FOREIGN PATENT DOCUMENTS

| | | |
|---|---|---|
| DE | 10 2007 032 780 A1 | 1/2009 |
| JP | 09-069294 | 3/1997 |
| JP | 09-509518 | 9/1997 |
| JP | 10-125087 | 5/1998 |
| JP | 2000-321332 | 11/2000 |
| JP | 2002-117692 | 4/2002 |
| JP | 2002-208286 | 7/2002 |
| JP | 2002-519808 | 7/2002 |
| JP | 2003-196988 | 7/2003 |
| JP | 2004-333246 | 11/2004 |
| JP | 2006-065973 | 3/2006 |
| JP | 2008-016112 | 1/2008 |
| JP | 2008-541487 | 11/2008 |
| JP | 2009-537056 | 10/2009 |
| JP | 2009-540432 | 11/2009 |
| JP | 2010-529677 | 8/2010 |
| KR | 10-2012-0017911 | 2/2012 |
| WO | WO 96/08823 | 3/1996 |
| WO | WO 00/00983 | 1/2000 |
| WO | WO 2006/125051 | 11/2006 |
| WO | WO 2007/145967 | 12/2007 |
| WO | WO 2010/074876 | 7/2010 |

OTHER PUBLICATIONS

English Translation of Notice of Preliminary Rejection mailed on Dec. 28, 2014 for Korean Application No. 10-2014-60276.
English Translation of Decision to Grant mailed on Jul. 1, 2014 for Japanese Application No. 2011-235151.
English Translation of Decision of Rejection mailed on Feb. 4, 2014 for Japanese Application No. 2011-235151.
English Translation of Notice of Preliminary Rejection mailed on Feb. 20, 2013 for Korean Patent Application No. 10-2011-120217.
English Translation of Notice of Preliminary Rejection issued Sep. 5, 2013 for Korean Application No. 10-2011-120217.
English Translation of Notice of Rejection Ground mailed on Apr. 9, 2013 for Japanese Application No. 2011-235151.
English Translation of Office Action issued Aug. 19, 2013 for German Application No. 102011085988.80.
English Translation of Office Action issued Nov. 22, 2013 for Chinese Application No. 201110370037.X.
English Translation of Notice of Final Rejection dated Mar. 26, 2014 for Korean Application No. 10-2011-120217, 2 pages.
English Translation of Notice of Preliminary Rejection dated Jun. 11, 2014 for Korean Application No. 10-2014-60276, 5 pages.
NUMONYX, 64-Gbit (8×8 Gbits), eight Chip Enable, 4224-byte page, 3 V supply, multiplane architecture, SLC NAND flash memories, www.numonyx.com, Nov. 2009, 19 pages.
NUMONYX, 16-Gbit, 4320-byte page, 3 V supply, multiplane architecture, multilevel cell NAND flash memory, www.numonyx.com, Sep. 2009, 79 pages.
Office Action issued on Oct. 22, 2014 for Taiwanese Application No. 100137412.
PCT Application Serial No. PCT/IT2009/000584, Filed Dec. 29, 2009, 52 pages.

\* cited by examiner

METHOD OF DYNAMICALLY SELECTING MEMORY CELL CAPACITY

CROSS-REFERENCE TO RELATED APPLICATIONS

This application is a continuation of U.S. patent application Ser. No. 14/283,117, filed May 20, 2014 and incorporated in its entirety by reference herein, which is a divisional of U.S. patent application Ser. No. 13/770,881, filed Feb. 19, 2013 and incorporated in its entirety by reference herein, which is a continuation of U.S. patent application Ser. No. 12/949,728, filed Nov. 18, 2010 and incorporated in its entirety by reference herein.

BACKGROUND

1. Field

Subject matter disclosed herein relates to techniques to operate memory.

2. Information

Memory devices are employed in many types of electronic devices, such as computers, cell phones, PDA's, data loggers, and navigational equipment, just to name a few examples. Among such electronic devices, various types of nonvolatile memory devices may be employed, such as NAND or NOR flash memories, SRAM, DRAM, and phase-change memory, just to name a few examples. In general, writing or programming operations may be used to store information in such memory devices, while a read operation may be used to retrieve stored information.

Parameters with which a memory operates may be established by a manufacturer of the memory. For example, such parameters may include current, voltage, and/or resistance reference values for memory operations such as read, program, erase, verify, and so on.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
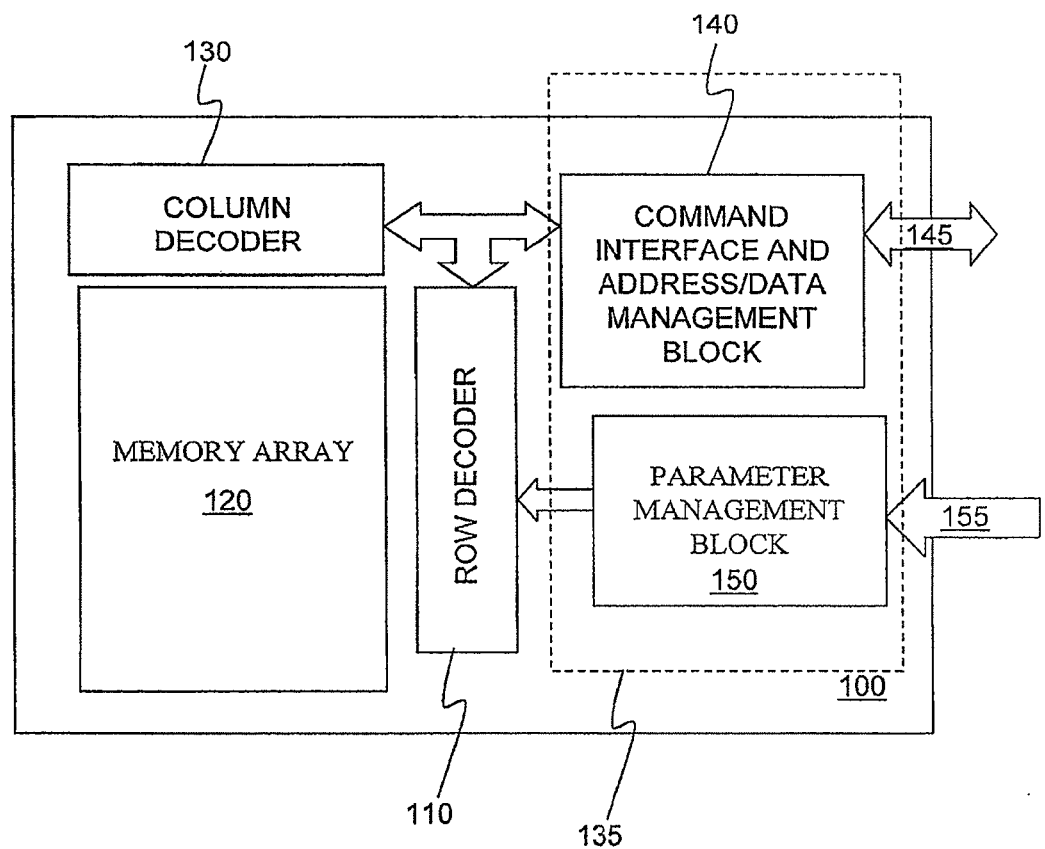
FIG. 1 is a schematic diagram of a memory device, according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

In an embodiment, a technique for operating a memory device may involve a memory instruction directed to the memory device that includes an operating parameter to affect a physical operating condition of the memory device. In particular, such an operating parameter may affect a physical operating condition of peripheral circuitry in a memory device. Peripheral circuitry internal to a memory device, for example, may comprise one or more power sources, sense amplifier circuitry, timing circuitry (e.g., a clock circuit), row/column decoders, and other such circuitry exclusive of an array of memory cells. Inclusion of such an operating parameter in a memory instruction may provide an opportunity for a user of the memory device to selectively manage such physical operating conditions of the memory device. For example, decreasing a margin between logic levels of a multilevel memory device (e.g., resulting in increased storage capacity at the expense of decreased precision) may be beneficial to a user for one application while increasing such a margin (e.g., resulting in increased precision at the expense of decreased storage capacity) may be beneficial for another application. In an example, applying a memory instruction READ, which includes an address and an operating parameter $V_{READ}$, may result in 1 or 0 depending on a threshold voltage being lower or higher than operating parameter value $V_{READ}$, respectively. An ability of a user to use other operating parameters may affect reliability and/or performance of a memory device and/or memory device characteristics such as write speed, adjustable margin with respect to program/read levels, number of levels stored in any memory cell, data encryption, and so on. A value of such an operating parameter may be selected by a user and/or instructions executed by a processor, for example. According to a communication protocol of a memory device, in an embodiment, specific bits of instruction code may be devoted to operating parameter information. For example, in a parallel device specific input/output terminals may receive/send the operating parameter's bits. However, in the case of a serial device such information may be input/output during pre-defined clock cycles in an instruction sequence, for example. A mixed serial-parallel protocol may be used in some cases to input an instruction including an operating parameter at memory pins. In one implementation, a physical operating condition used during execution of a command may assume one among a pre-defined set of possible values depending, at least in part, on corresponding information provided with the operating parameter. Such a correspondence may be established by a look-up table, for example.

A memory device that may be operated using a memory instruction as described above may comprise volatile or nonvolatile memory including flash NAND, flash NOR, phase change memory (PCM), single level cell (SLC) memory, multilevel cell (MLC) memory, and so on. In particular, an instruction directed to a memory device may comprise a number of elements including a command such as a read command, a write or program command, an erase command, and so on. Such elements of an instruction may also include an address of a location in a memory array of the memory device to where data is to be written or from where data is to be read, for example. Accordingly, an instruction to write to a memory array may also comprise such data. In addition to such elements of an instruction (e.g., a command, address, data, and so on), such an instruction may additionally include one or more operating parameters to be used during execution of the instruction and/or subsequent instructions, as explained in detail below. Such operating parameters may comprise a voltage reference level of a memory cell in a memory array, a margin between or among logic levels of the memory cell, or a ramp speed of a bias signal to be applied to the memory cell, just to name a few examples. In one implementation, the memory device may perform the instruction including interpreting the operating parameter, generating one or more physical quantities that correspond to the operating parameter, and applying the one or more physical quantities to appropriate nodes/circuits of the memory device.

In one embodiment, such an operating parameter included in a memory instruction may be received by a memory device as a digital or analog value or as a code to be interpreted by the memory device to determine one or more physical operating conditions and/or operating modes of the memory device. Such a memory device may include a parameter management block used to perform a memory instruction by interpreting operating parameters and affecting operating conditions of peripheral circuitry in the memory device corresponding to the operating parameters, as described in further detail below.

In one embodiment, an operating parameter included in a memory instruction may be used to program memory cells, e.g., modify the program cells' threshold voltage, to a level specified by the operating parameter; this may be achieved by affecting a physical operating condition used in a program verification phase to end the program operation. For example, such an operating parameter may be used to set the threshold voltage reference value to a desired value corresponding to the input operating parameter. In a similar fashion, an operating parameter included in a memory read instruction may be used to retrieve data previously stored at a memory address under specific physical operating conditions, such as a wordline read voltage, specified by the operating parameter. Among other advantages, a user may benefit from the operations described above because, being the only one aware of the programming conditions, a user may also be the only one able to correctly retrieve the stored data at a later time, as it will be explained below.

In one embodiment, such an operating parameter included in a memory instruction may be useful during a process of bit manipulation. Bit manipulation may be used if writing data in a page of memory is to be performed in different steps or stages. In such cases, additional bits are to be programmed on pages of memory already partly programmed. For example, bit manipulation may be used for partial programming, such as during testing various functions or operations of a computing system, wherein additional programming may be performed at a later time (e.g., during further testing). In another example, bit manipulation may be used by a user to personalize or customize a memory device. In such a case, data and/or code may be only partially loaded into the memory device by the manufacturer at the end of a fabrication process before shipment, and the user may subsequently insert additional information (e.g., passwords, code, and so on) to increase security, for example. In yet another example, bit manipulation may be used in situations where data is to be relatively frequently changed (e.g., in a region of memory maintaining headers or in a File Allocation Table pointing to the memory and representing an internal organization of the memory). In such a case, bit manipulation may provide an opportunity to avoid erasure of and/or re-programming an entire block of memory. Of course, such details of techniques to operate a memory device using an operating parameter are merely examples, and claimed subject matter is not so limited.

Bit manipulation may or may not involve error correction code (ECC) for intermediate stages of the bit manipulation process. In one implementation, ECC may be computed and programmed only after complete data have been stored (e.g., at the end of a bit manipulation process). In such a case, however, a first portion of data may not be ECC protected, resulting in a risk of error during data read-out at intermediate stages (and consequent mistakes in ECC computation at later stages of the bit manipulation process). In contrast, if a first portion of data resulting from an early stage of a bit manipulation process is to be ECC protected, additional memory cells may be provided to store ECC during such an early stage of the bit manipulation process. Such additional memory cells may be an undesirable additional cost if it is not possible to write "1" over "0" in memory without erasing a whole block of memory, for example. As discussed in detail below, an operating parameter included in a memory instruction may be useful for bit manipulation and ECC processes. Of course, such details of bit manipulation are merely examples, and claimed subject matter is not so limited.

Though embodiments described herein include memory instructions comprising one or more operating parameters (e.g., operating parameters comprising input information), operating parameters may also comprise information that is a result of an execution of a command (e.g., operating parameters comprising output information). Such one or more operating parameters may also accompany results of an execution of a command. For example, one or more operating parameters may accompany read data resulting from execution of a read command. In an implementation, an operating parameter may represent a read voltage at which an operation was carried out.

FIG. 1 is a schematic diagram of a memory device 100, according to an embodiment. Such a memory device may be used to perform techniques described above, for example. In detail, memory device 100 may comprise a memory array 120 to store addressable data, a row decoder 110 and column decoder 130, and a microcontroller 135 including a command interface and address/data management block 140 and an operating parameter management block 150. A port 145 may be used to receive elements of a memory instruction such as a command, an address of one or more memory cells in memory array 120, and/or data to be written to memory array 120, for example. Port 145 may also be used to transmit read data, among a number of other possibilities. In one implementation, port 145 may also be used to receive one or more operating parameters that may be included with a memory instruction. In another implementation, such operating parameters may be provided to memory device 100 at port 155. Either of port 145 or port 155 may comprise a parallel or a serial port. In the case of serial ports, for example, multiple input cycles may be used to provide all or a portion of a memory instruction, including a command, address, data, and/or operating parameter information. In one implementation, an operation window (e.g., a time span to perform a write/read/erase operation) of N cycles may be allocated to input N bits of operating parameter information. As an illustrative example, such a window may be placed after eight COMMAND cycles (e.g., for a one-byte command) and before twenty-four ADDRESS cycles (e.g., for a three-byte address), though claimed subject matter is not so limited. On the other hand, in the case of parallel ports, for example, operating parameter information may be input through dedicated pins in port 155. In one implementation, some data pins in port 145 may be used to input operating parameter information if a memory instruction includes a READ command (since such a READ command need not include input data). In another implementation, if a memory instruction includes a sector erase command, all address pins may not be necessary. Accordingly, least significant address pins may be available to input operating parameter information. In a case of an instruction comprising a chip erase command to erase the whole memory, no address input nor data input are necessary and all or part of the corresponding pins may be used to input operating parameter information. Of course, such details of techniques to receive elements of a memory instruction are merely examples, and claimed subject matter is not so limited.

In an embodiment, upon receiving a memory instruction that includes a command and operating parameter information, microcontroller 135 may interpret the command and use the operating parameter information to execute the memory instruction. To list a few examples, such an operating parameter may represent a voltage, such as a wordline (WL) read voltage, a WL program voltage, a WL verification voltage, a voltage difference, a voltage margin with respect to a pre-defined value (e.g., as used in a program verify operation), and/or a voltage step during a program/erase ramp. However, such an operating parameter may also represent a current value (e.g., for use in flash or floating gate memories) or other physical quantity, such as a resistance value (e.g., for use in PCM), or a time duration or delay, such as, for example, a lapse of time between a bitline pre-charging and a bitline sensing in a NAND memory. In one implementation, such an operating parameter may comprise a code corresponding to one among a pre-defined set of allowed values for a particular quantity (depending on the command to which the operating parameter refers). For example, one of sixteen possible voltage (or current, or resistance, etc.) levels may be chosen according to the value of a four-bit parameter code. In another implementation, such an operating parameter may comprise a combination of a code and a value. For example, during a program operation it may be possible to select a value for verification voltage (specified by code 1), or for margin (code 2) with respect to a pre-defined verification voltage, or a voltage step amplitude (code 3), or a step duration (code 4) to be used in a programming voltage ramp. Correspondingly, the code-value combination may result in the specified one among the possible physical operating conditions being affected by the value of the operating parameter.

In an embodiment, upon receiving operating parameter information via port 155, operating parameter management block 150 may internally generate a physical quantity corresponding to the operating parameter information. For example, in one implementation, operating parameter management block 150 may include a voltage (or current) generator to generate a voltage (or current) with a specified precision that corresponds to the operating parameter information. Such a physical quantity may be applied to relevant circuit portions, such as a wordline in memory array 120, timing circuitry (not shown), and so on.

TABLE 1 illustrates an example of an instruction set comprising a number of memory instructions including WRITE ENABLE, READ, PAGE PROGRAM, SECTOR ERASE, and CHIP ERASE. Each such memory instruction may be represented by an instruction code; it may also include an address, operating parameter(s), and data, as described above. A dummy portion, which may be useful in some applications, may also be included.

TABLE 1

| Instruction | Description | One-byte instruction code | Address bytes | Parameter bytes | Dummy bytes | Data bytes |
| --- | --- | --- | --- | --- | --- | --- |
| WREN | Write Enable | 06h | 0 | 0 | 0 | 0 |
| READ | Read Data Bytes | 03h | 3 | 1 | 0 | 1 to ∞ |
| PP | Page Program | 02h | 3 | 2 | 0 | 1 to 256 |
| SE | Sector Erase | D8h | 2 | 1 | 0 | 0 |
| CE | Chip Erase | 60h or C7h | 0 | 3 | 0 | 0 |

For example, WRITE ENABLE memory instruction may be represented by a one-byte hexadecimal code 06, READ memory instruction by 03, PAGE PROGRAM memory instruction by 02, and SECTOR ERASE memory instruction by D8 and CHIP ERASE memory instruction by 60 or C7. READ memory instruction may include a three-byte address and a one-byte operating parameter code, which may comprise a wordline read voltage, for example. PAGE PROGRAM memory instruction may include a three-byte address and a two-byte operating parameter code, which may comprise two different parameters. One parameter may comprise an encryption encoding scheme and the other parameter may comprise a program verify (WL) voltage, for example. SECTOR ERASE memory instruction may include a two-byte address and a one-byte operating parameter code, which may represent a voltage step (or step duration) in an erase voltage ramp. CHIP ERASE memory instruction may include three one-byte operating parameter codes, which may represent a reference current level, a wordline read voltage, and/or a well or body read voltage to be used in verifying the memory cells during an erase operation of the entire memory, for example. Of course, such details are merely examples, and claimed subject matter is not so limited.

Figure 2:
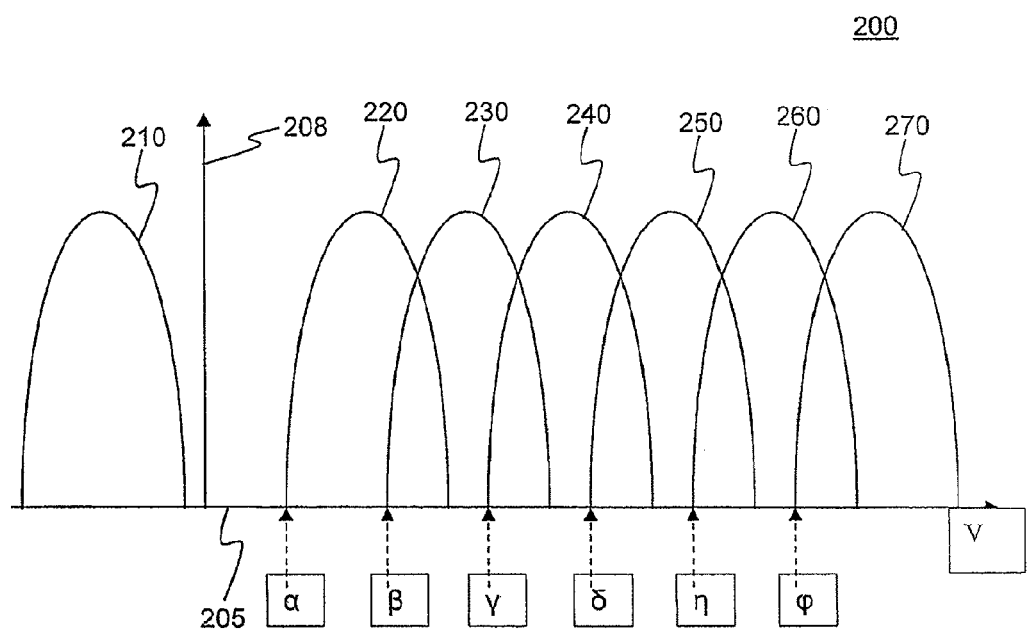
FIG. 2 is a plot showing characteristics of a memory cell and measurement parameters, according to an embodiment.

FIG. 2 is a plot showing characteristics of one or more memory cells and measurement parameters, according to an embodiment. In particular, a state diagram 200 may be descriptive of a distribution of states in a MLC memory device, for example. A horizontal axis 205 represents relative voltages associated with memory states while vertical axis 208 may represent a relative number of memory cells in an array of the MLC memory device. Of course, positions and/or scales of such axes are merely examples, and claimed subject matter is not limited in this respect. State diagram 200 shows an erased or reset state 210 and programmed or set states 220, 230, 240, 250, 260, and 270, according to an embodiment. Such set states individually begin at threshold voltage values $\alpha$, $\beta$, $\gamma$, $\delta$, $\eta$, $\phi$, respectively. Such memory states of a memory cell may be defined by an amount of voltage placed on a gate of the memory cell during a read operation in specified operating conditions, for example.

In an embodiment, operating parameters included in a memory instruction may be used to select, for example, one or more threshold voltage values of a MLC memory device. As mentioned above, such operating parameters may be user-selectable. Though such MLC memory devices may have been manufactured to have substantially the same electrical and/or operating characteristics as one another, various operating conditions, such as threshold voltage reference values, may be modified differently for different MLC memory devices, subsequent to such user selection of operating parameters. For example, threshold voltage reference values $\alpha$, $\beta$, $\gamma$, $\delta$, $\eta$, $\phi$ may be established in response to a user selecting particular operating parameters in a memory instruction to program the MLC memory device. As mentioned above, an operating parameter may comprise a code comprising a set of pre-defined values representing a physical quantity associated with the parameter. For example, for a three-bit parameter, bits 001 may correspond to 0 volts, 010 may correspond to a volts, 011 may correspond to $\beta$ volts, 100 may correspond to $\gamma$ volts, 101 may correspond to $\delta$ volts, 110 may correspond to $\eta$ volts, and 111 may correspond to $\phi$ volts, though claimed subject matter is not so limited. Such an opportunity for a user to select threshold reference voltage values may lead to customization of the MLC memory device for particular application requirements of a user, for example. Also, such an opportunity for a user to select threshold reference voltage values may include implementation of password protection of data stored in the MLC memory. For example, only a user having knowledge of threshold voltage values used to write particular data into the MLC memory device may subsequently be able to read the particular data (using the threshold voltage reference values used during program operation). In an implementation, a threshold voltage value $V_T$ need not have a unique logic value associated with it. For example, $\alpha<V_T<\beta$ may represent a "0" with respect to $\alpha$, but $\alpha<V_T<\beta$ may represent a "1" with respect to $\beta$. In such a case, for example, only the user may know with respect to which reference level a read operation should be performed at any particular address. Accordingly, only the user may be able to retrieve the correct datum (e.g., whether a memory cell at a particular address was programmed with $\alpha<V_T<\beta$ to mean "0" or "1"). It may therefore be possible for the user to define and establish encoding schemes suitable for encryption. For example, the user may freely assign logical values to threshold voltage ranges measured with respect to particular reference levels in the bit position in the byte or word. At read-out the correct parameter code(s) may be input in order to retrieve meaningful data. In a particular implementation, to increase security of stored data, read data may be considered valid only if such data falls within a specified range, which may only be known to a user. Such ranges, for example, may comprise read data between $\alpha$ and $\delta$, between $\beta$ and $\phi$, or between $\gamma$ and $\eta$. Also, by selecting one or more operating parameters in a memory instruction, a user may define different logic values (e.g., "0" or "1") in different threshold voltage ranges. For example, "1" may be represented by $V_T<\alpha$ or $\gamma<V_T<\delta$, and "0" may be represented by $\alpha<V_T<\gamma$ or $\delta<V_T<\phi$. In one implementation, threshold voltage values $\alpha$, $\beta$, $\gamma$, $\delta$, $\eta$, $\phi$ may be stored in the MLC memory device to be used as a "key" to read the particular data. Moreover, it is noted that correspondence between logic values and threshold voltage ranges may be independently defined for different portions of the memory array, resulting in still further increased flexibility and security. Of course, such details of operating parameters are merely examples, and claimed subject matter is not so limited.

In an embodiment, a varying amount of information may be stored in a memory array by redefining (e.g., for individual memory cells of the memory array) a number of allowed state levels during a program operation to write data to the memory array. Subsequently, such data may be read based on a defined number of allowed state levels. For example, a portion of memory cells in a memory array may comprise two-level (1 bit) encoding memory cells, another portion of memory cells may comprise three-level (1.5 bits) encoding memory cells, yet another portion of memory cells may comprise four-level (2 bits) encoding memory cells, and so on. In this case, using FIG. 2 as an exemplifying reference, memory cells in the array may be programmed and read using the operating parameter $\beta$ as threshold voltage reference value, if they belong to the first one portion (1 bit), with respect to $\gamma$ and $\eta$, if they belong to the another portion (1.5 bit), and using $\alpha$, $\delta$ and $\phi$ if they belong to the yet another portion (2 bits/cell). Accordingly, memory capacity of a memory array may be varied dynamically by selecting one or more operating parameters (e.g., with a write command) that affect memory cell encoding.

In an embodiment, during a process of bit manipulation, described above, logic content of multi-level memory cells may be defined so as to allow for overwriting "1" onto "0" in the memory. For example, a user, being aware of pending steps in a bit manipulation process, may use different operating parameters to access (e.g., program or read) multi-level memory cells so that different allowed threshold voltage ranges may be associated with logical values stored therein. Returning to FIG. 2, the following example describes a particular process of bit manipulation involving ECC. Such a process of bit manipulation may include two program operations, as in the present example. In a first program operation, a portion of data may be written to a page (wherein ECC may protect a whole page). In the first program operation, a user may select (via one or more operating parameters in a memory instruction) two lowest $V_T$ distributions (target distributions) 210 and 220 to store the data. For example, "1" may be stored using $V_T$ distribution 210 and "0" may be stored using $V_T$ distribution 220 (un-programmed data may remain in a "1" state). Programming a "0" may be carried out by providing an instruction that comprises a program command, an address, data, and an operating parameter that represents a wordline program verify level, such as $V_T=\alpha$ in FIG. 2. In a similar way, such data may be read from pages of memory subject to bit manipulation by using an instruction that comprises a read command, an address, and an operating parameter that represents a wordline read voltage, such as $V_T=0$ Volts (e.g., to discriminate between "1" and "0" at the first program operation).

During a second program operation of the bit manipulation process, additional bits may be programmed, which may result in ECC bits being subject to change, including otherwise forbidden "0" to "1" transitions. A user may select (via one or more operating parameters in a memory instruction) two $V_T$ distributions different from the $V_T$ distributions used in the first program operation described above. Thus, for example, "1" may be stored using $V_T$ distribution 240 and "0" may be stored using $V_T$ distribution 270. Previously programmed data may be copied from distribution 210 to distribution 240 and from distribution 220 to distribution 270, to maintain consistency in the association between threshold voltage ranges and logical values. Programming a "0" may be carried out by providing an instruction that comprises a program command, an address, data, and a first operating parameter and a second operating parameter. The first operating parameter may comprise a wordline program verify level for an "erased" state (e.g., $V_T=\gamma$ in FIG. 2), and the second operating parameter may comprise a wordline program verify level for a "programmed" state (e.g., $V_T=\phi$). In one implementation, after this stage of the bit manipulation process, reading data from pages of memory subject to bit manipulation may be carried out using an instruction comprising a read command, an address, and an operating parameter that represents a wordline read voltage, such as $V_T=\eta$ Volts (to discriminate between "1" and "0" at this stage with a single access to the memory cell), for example.

The following example describes a particular process of bit manipulation involving ECC, according to an embodiment. Such a process of bit manipulation may include more than two program operations. In the case of the following example, a process of bit manipulation includes three program operations. In a first program operation, a portion of data may be written to a page. In the first program operation, a user may select (via one or more operating parameters in a memory instruction) two lowest $V_T$ distributions (target distributions) 210 and 220 to store the data. For example, "1" may be stored using $V_T$ distribution 210 and "0" may be stored using $V_T$ distribution 220 (un-programmed data may remain in a "1" state). As explained above, programming a "0" may be carried out by providing an instruction that comprises a program command, an address, data, and an operating parameter that represents a wordline program verify level, such as $V_T=\alpha$ in FIG. 2. In a similar way, such data may be read from pages of memory subject to bit manipulation by using an instruction that comprises a read command, an address, and an operating parameter that represents a wordline read voltage, such as $V_T=0$ Volts (e.g., to discriminate between "1" and "0" at the first program operation of the bit manipulation process).

During a second program operation of a bit manipulation process, target $V_T$ distributions (e.g., selected by a user via operating parameters) may comprise the $V_T$ distribution 220, which may represent a "0" for already-programmed data that are not changed (e.g., writing "0" onto "0") and for newly programmed data (e.g., writing "0" onto "1"). Also, another target $V_T$ distribution may comprise the $V_T$ distribution 240, which may represent a "1" for already-programmed data that are not changed (e.g., writing "1" onto "1") and for newly programmed data (e.g., writing "1" onto "0"). In such a case, an operating parameter included in a memory instruction may represent a program-verify voltage for "1" (e.g., $\gamma$). Also in such a case, in the second program operation, "0" may be associated with a lower threshold voltage than that of "1". Accordingly, such data may be read from pages of memory subject to bit manipulation by using an instruction that comprises a read command, an address, and an operating parameter that represents a wordline read voltage, such as $V_T=\gamma$, for example.

During a third program operation of a bit manipulation process, target $V_T$ distributions (e.g., selected by a user via operating parameters) may comprise the $V_T$ distribution 240, which may represent a "1" for already-programmed data that are not changed (e.g., writing "1" onto "1") and for newly programmed data (e.g., writing "1" onto "0"). Also, another target $V_T$ distribution may comprise the $V_T$ distribution 270, which may represent a "0" for already-programmed data that are not changed (e.g., writing "0" onto "0") and for newly programmed data (e.g., writing "0" onto "1"). In such a case, an operating parameter included in a memory instruction may represent a program-verify voltage for "0" (e.g., $\phi$). Also in such a case, in the third program operation, "1" may be associated with a lower threshold voltage than that of "0". Accordingly, such data may be read from pages of memory subject to bit manipulation by using an instruction that comprises a read command, an address, and an operating parameter that represents a wordline read voltage, such as $V_T=\phi$ (or $V_T=\eta$, to increase the read margin with respect to programmed cells in $V_T$ distribution 270), for example. Of course, such details of bit manipulation are merely examples, and claimed subject matter is not so limited.

Figure 3:
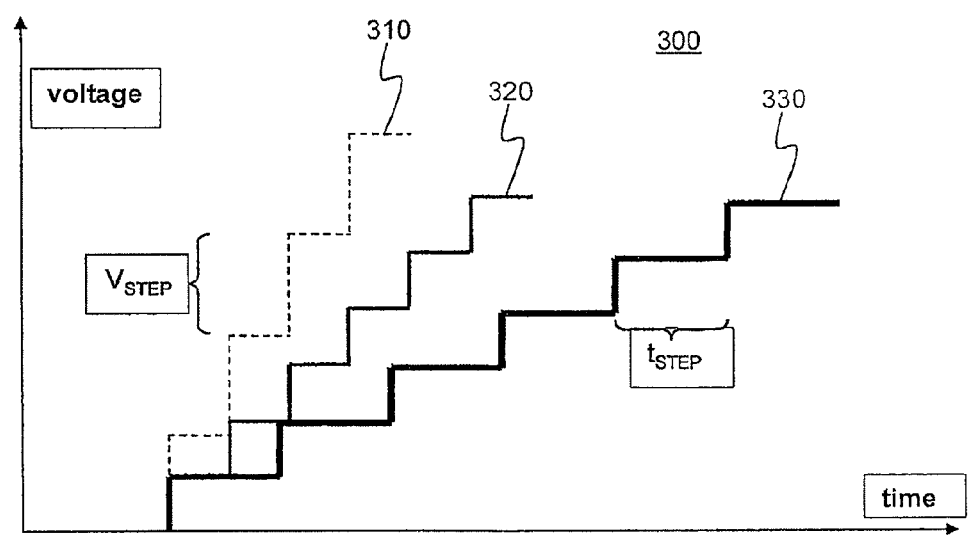
FIG. 3 includes plots showing characteristics of bias signal wave-forms and memory cell voltage or current, according to an embodiment.

FIG. 3 includes plots showing characteristics 300 of bias signal wave-forms and memory cell voltage or current, according to an embodiment. Such bias signal wave-forms may be applied to a gate of a memory cell, for example, to be used to program a state of the memory cell (possible variations for end of program verification between subsequent steps may not be represented in the wave-form diagram). Bias signal wave-form 310 includes a relatively large voltage step $V_{step}$ and relatively short time step $T_{step}$. In contrast, bias signal wave-form 330 includes a relatively small voltage step $V_{step}$ and relatively long time step $T_{step}$. Bias signal wave-form 320 includes a voltage step $V_{step}$ and a time step $T_{step}$ that are between values for bias signal wave-form 310 and bias signal wave-form 330. Values of voltage step $V_{step}$ and time step $T_{step}$ may affect precision and/or speed of a memory operation. Though claimed subject matter is not so limited, increasing precision may result in decreased speed of a memory operation, whereas decreasing precision may result in increased speed of a memory operation. In an implementation, values for voltage step $V_{step}$ and a time step $T_{step}$ (and thus precision and/or speed) may be selected by one or more values and/or codes of an operating parameter included in a memory instruction, as discussed above. Accordingly, performance of a memory device may be selected by a user who may prefer a memory operation to be relatively fast rather than precise, or to be relatively slow and highly precise (e.g., relatively many levels of states of a single memory cell may be preferred at the cost of longer execution time). Of course, such details of bias waveforms are merely examples, and claimed subject matter is not so limited.

In one implementation, one portion of a memory array may be affected by one or more operating parameters differently than another portion of the memory array. In other words, operating parameters need not affect all portions of a memory array in the same fashion. Thus, for example, different blocks, pages, words, or bytes may have different encoding based, at least in part, on one or more operating parameters included in a memory instruction, as described above.

In an embodiment, a process to write information to a PCM cell may comprise setting or resetting the PCM cell to one state or another. For example, a PCM cell may be reset by melting phase change material by applying a relatively high amplitude, relatively short duration electrical programming pulse. In contrast, a PCM cell may be set by applying a relatively smaller sub-melt amplitude electrical programming pulse having a relatively longer duration, which may include a relatively abrupt drop, for example. A PCM cell may also be set by applying a higher over-melt amplitude electrical programming pulse, possibly having a gradual, sloping drop in voltage or current over time, to allow molten phase change material to crystallize. Such a reset and/or set pulse and process may be applied as a "write" or "program" pulse and a "write" or "program" process. In an implementation, one or more operating parameters may accompany a write command in a memory instruction, as described above. Values of such operating parameters may affect various elements of a programming pulse, such as magnitude, duration, slope, and so on. Of course, such details of a programming pulse are merely examples, and claimed subject matter is not so limited.

Figure 4:
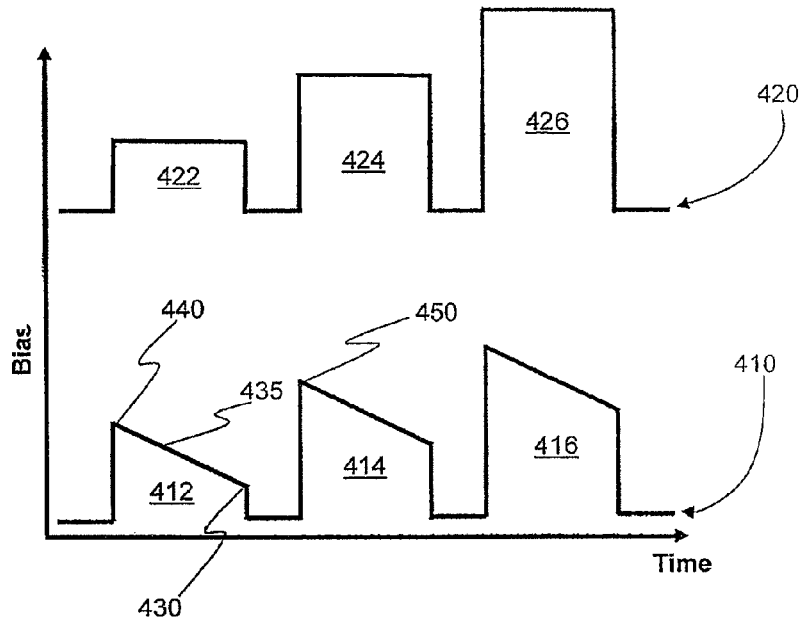
FIG. 4 includes plots showing characteristics of bias signal wave-forms and memory cell voltage or current, according to an embodiment.

FIG. 4 includes plots showing characteristics of bias signal wave-forms and memory cell voltage or current, according to an embodiment. Such bias signal wave-forms may be applied to PCM cells during a process of reading the PCM cells (e.g., such as during a write-verify process). As explained below, particular characteristics of such bias signal wave-forms may be selected using an operating parameter included in a memory instruction. For example, a memory instruction may comprise a write command, an address of a memory array, data to be written, and one or more operating parameters to affect one or more particular characteristics of bias signal wave-forms to be used to write the data to the memory array. Such particular characteristics of bias signal wave-forms may include pulse amplitude, pulse slope, pulse step width, pulse step height, and so on. Further, an operating parameter may be used to select among a number of types of bias signal wave-form, such as bias signal wave-forms 410 and 420. For example, bias signal wave-form 410 may include a series of set pulses 412, 414, and 416 comprising a waveform having individual peak amplitudes that sequentially increase from one pulse to the next. Such a bias signal wave-form may address an issue of variability of physical and/or electrical characteristics of a plurality of PCM cells in a PCM or in multiple PCM devices. In one particular implementation, first bias pulse 412 may comprise a negative-slope set ramp 435 extending from peak amplitude 440 to a ramp terminus 430. Though set pulse 412 is shown to have a linear set ramp and vertical transitions, plot 400 is only intended to represent a schematic view of bias signal, and claimed subject matter is not limited in this respect. In one particular implementation, peak amplitude 450 of second set pulse 414 may be greater than peak amplitude 440 of the previous, first set pulse 412. As another example, bias signal wave-form 420 includes a series of reset pulses 422, 424, and 426 comprises a waveform having individual amplitudes that sequentially increase from one pulse to the next, for example. In contrast to bias signal wave-form 410, bias signal wave-form 420 need not include a negative-slope set ramp. Of course, such details of techniques to operate a PCM are merely examples, and claimed subject matter is not so limited.

Figure 5:
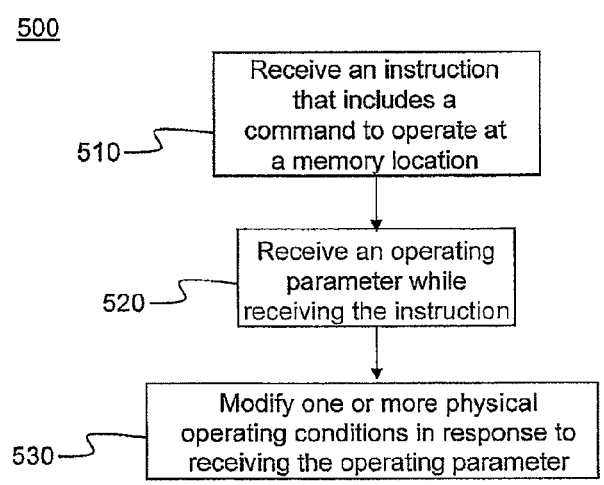
FIG. 5 is a flow diagram of a process to operate a memory device, according to an embodiment.

FIG. 5 is a flow diagram of a process 500 to operate a memory device, according to an embodiment. As discussed above, a technique for operating a memory device may involve a memory instruction directed to the memory device that includes an operating parameter to affect a physical operating condition of the memory device. At block 510, the memory device may receive such a memory instruction that includes a command to operate at a memory location. At block 520, in addition to including a command and possibly an address descriptive of the memory location, the memory device may receive the memory instruction including an operating parameter. For example, a memory instruction may include a READ command, an address, and an operating parameter $V_{READ}$, which may be used to select a reference threshold voltage for memory cells specified by the address. In a particular implementation, such an operating parameter need not comprise a value of a voltage, for example, but instead may comprise a code that represent values of a voltage (or current, or time, and so on). In one case, the memory device may store a table of values used to convert a code of an operating parameter to an actual voltage or current. Such a table may be created and/or modified by writing to the table (maintained in a portion of the memory device), for example. Such a conversion of (digital) code to an actual (analog) voltage or current may be performed by a digital-to-analog-convertor (DAC) and/or a voltage or current generator, which may be included in the memory device. As mentioned above, the memory device may receive such an operating parameter serially or in parallel with the command and memory address. At block 530, while performing the memory instruction received at block 510, one or more physical operating conditions (e.g., threshold voltage of memory cells) of the memory device may be modified based, at least in part, on the operating parameter. Of course, such details of process 500 are merely examples, and claimed subject matter is not so limited.

Figure 6:
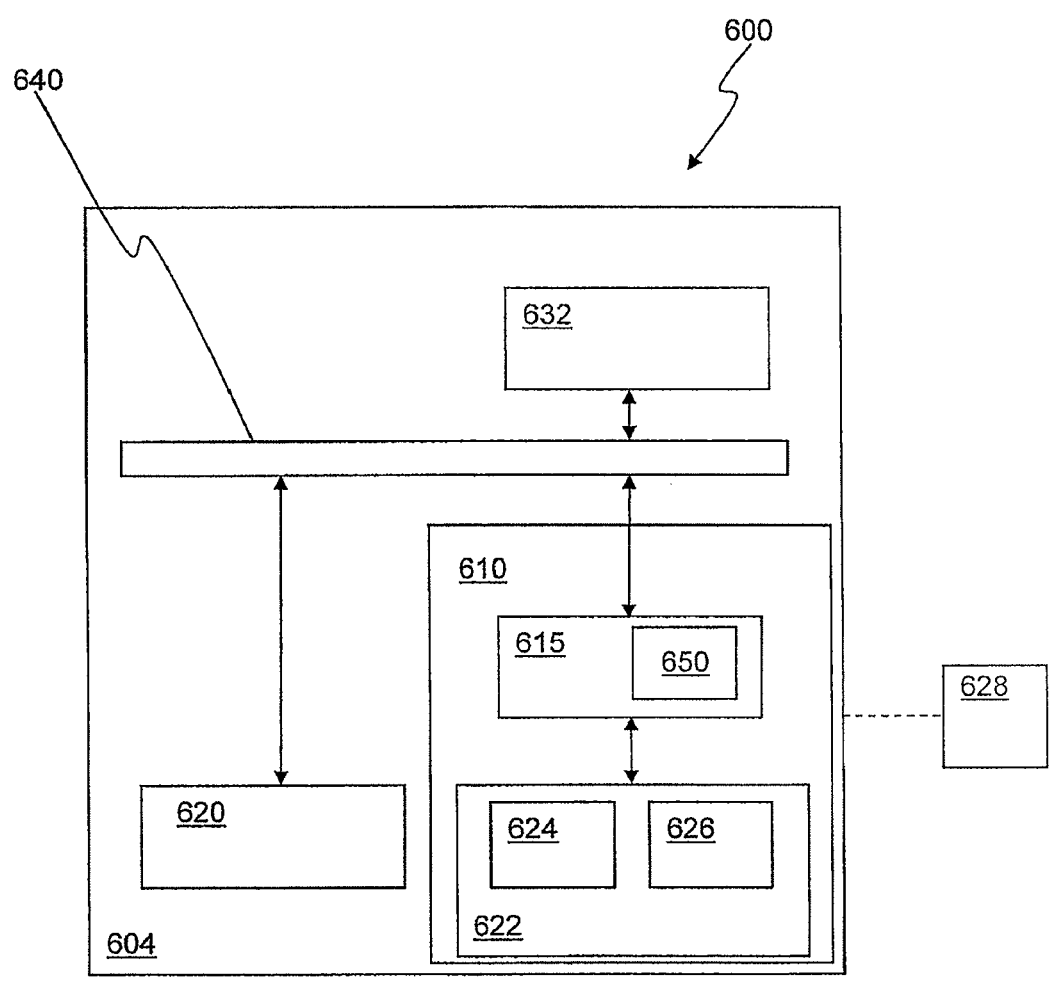
FIG. 6 is a schematic diagram illustrating an exemplary embodiment of a computing system.

FIG. 6 is a schematic diagram illustrating an exemplary embodiment of a computing system 600 including a memory device 610. Such a computing device may comprise one or more processors, for example, to execute an application and/or other code. For example, memory device 610 may comprise a memory that includes a portion of PCM 100, shown in FIG. 1. A computing device 604 may be representative of any device, appliance, or machine that may be configurable to manage memory device 610. Memory device 610 may include a memory controller 615 and a memory 622. In one implementation, memory controller 615 may include a parameter management block 650 to receive an operating parameter included in a memory instruction, and to modify physical operating conditions of memory device 610 based, at least in part, on the operating parameter. By way of example but not limitation, computing device 604 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system; and/or any combination thereof.

It is recognized that all or part of the various devices shown in system 600, and the processes and methods as further described herein, may be implemented using or otherwise including hardware, firmware, software, or any combination thereof. Thus, by way of example but not limitation, computing device 604 may include at least one processing unit 620 that is operatively coupled to memory 622 through a bus 640 and a host or memory controller 615. Processing unit 620 is representative of one or more circuits configurable to perform at least a portion of a data computing procedure or process. By way of example but not limitation, processing unit 620 may include one or more processors, controllers, microprocessors, microcontrollers, application specific integrated circuits, digital signal processors, programmable logic devices, field programmable gate arrays, and the like, or any combination thereof. Processing unit 620 may include an operating system configured to communicate with memory controller 615. Such an operating system may, for example, generate memory instructions including commands, addresses, and/or operating parameters to be sent to memory controller 615 over bus 640. Such commands may comprise read, write, or erase commands. In response to such memory instructions, for example, memory controller 615 may perform process 500 described above, to perform the command and/or modify one or more physical operating conditions of memory device 610. For example, memory controller 615 may increase a magnitude of a bias signal applied to at least one of an array of PCM cells in response to an operating parameter included in a memory instruction.

Memory 622 is representative of any data storage mechanism. Memory 622 may include, for example, a primary memory 624 and/or a secondary memory 626. Primary memory 624 may include, for example, a random access memory, read only memory, etc. While illustrated in this example as being separate from processing unit 620, it should be understood that all or part of primary memory 624 may be provided within or otherwise co-located/coupled with processing unit 620.

Secondary memory 626 may include, for example, the same or similar type of memory as primary memory and/or one or more data storage devices or systems, such as, for example, a disk drive, an optical disc drive, a tape drive, a solid state memory drive, etc. In certain implementations, secondary memory 626 may be operatively receptive of, or otherwise configurable to couple to, a computer-readable medium 628. Computer-readable medium 628 may include, for example, any medium that can carry and/or make accessible data, code, and/or instructions for one or more of the devices in system 600.

Computing device 604 may include, for example, an input/output 632. Input/output 632 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 632 may include an operatively configured display, speaker, keyboard, mouse, trackball, touch screen, data port, etc.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method of using a multi-level cell memory device, the method comprising:
   responsive to a first instruction, writing first data to a first portion of a memory array using a first number of threshold voltage values corresponding to a respective first number of states, wherein the first instruction includes a first operating parameter indicating particular values of the first number of threshold voltage values; and
   responsive to a second instruction, writing second data to a second portion of the memory array using a second number of threshold voltage values corresponding to a respective second number of states, wherein the second instruction includes a second operating parameter indicating particular values of the second number of threshold values, and wherein the second number of states is different from the first number of states.

2. The method of claim 1, wherein the first instruction comprises a first write-command and the first operating parameter, and wherein the second instruction comprises a second write command and the second operating parameter, wherein at least one of the number of first threshold voltage values is different than at least one of the second threshold voltage values.

3. The method of claim 2, further comprising:
   reading the first data from the first portion of the memory array in response to receiving a third instruction comprising a first read command and at least the first operating parameter; and
   reading the second data from the second portion of the memory array in response to receiving a fourth instruction comprising a second read command and at least the second operating parameter.

4. The method of claim 1, further comprising, subsequent to writing the first data to the first portion of the memory array using the particular values of the first number of threshold voltage values, writing third data to the first portion of the memory array using the particular values of the second number of threshold voltage values.

5. The method of claim 4, wherein writing the third data to the first portion of the memory array is performed in response to receiving a fifth instruction comprising a third write command and at least the second operating parameter.

6. The method of claim 5, further comprising reading the third data from the first portion of the memory array in response to receiving a sixth instruction comprising a third write command and at least the second operating parameter.

7. The method of claim 1, wherein the first number of states is two and the second number of states is either three or four.

8. The method of claim 1, further comprising writing third data to a third portion of the memory array using a third number of threshold voltage values corresponding to a respective third number of states, the third number of states is different from the second number of states and different from the first number of states.

9. The method of claim 8, wherein writing third data to the third portion of the memory array is performed in response to receiving a third instruction comprising a third write command and at least a third operating parameter indicating particular values of the third number of threshold values.

10. A memory device comprising:
    a plurality of multi-level memory cells; and
    circuitry to:
       responsive to a first instruction, write first data to a first portion of a memory array using a first number of threshold voltage values corresponding to a respective first number of states, wherein the first instruction includes a first operating parameter indicating particular values of the first number of threshold voltage values; and
       responsive to a second instruction, write second data to a second portion of the memory array using a second number of threshold voltage values corresponding to a respective second number of states, wherein the second instruction includes a second operating parameter indicating particular values of the second number of threshold values, wherein the second number of states is different from the first number of states.

11. The memory device of claim 10, wherein the first instruction comprises a first write command and the first operating parameter, wherein the second instruction comprises a second write command the second operating, wherein at least one of the number of first threshold voltage values is different than at least one of the second threshold values.

12. The memory device of claim 11, wherein the circuitry further:
   reads the first data from the first portion of the memory array in response to receiving a third instruction comprising a first read command and at least the first operating parameter; and
   reads the second data from the second portion of the memory array in response to receiving a fourth instruction comprising a second read command and at least the second operating parameter.

13. The memory device of claim 10, wherein the circuitry, subsequent to writing the first data to the first portion of the memory array using the first number of threshold voltage values, writes third data to the first portion of the memory array using the second number of threshold voltage values.

14. The memory device of claim 13, wherein the circuitry writes the third data to the first portion of the memory array in response to receiving a fifth instruction comprising a third write command and at least the second operating parameter.

15. A memory system comprising:
   a memory device comprising a plurality of multi-level memory cells and a memory controller to:
   responsive to a first instruction, write first data to a first portion of a memory array using a first number of threshold voltage values corresponding to a respective first number of states, wherein the first instruction includes a first operating parameter indicating particular values of the first threshold voltage values;
   responsive to a second instruction, write second data to a second portion of the memory array using a second number of threshold voltage values corresponding to a respective second number of states, wherein the second instruction includes a second operating parameter indicating particular values of the second number of threshold values, and wherein the second number of states is different from the first number of states; and
   a processor configured to provide access to the plurality of multi-level memory cells.

16. The memory system of claim 15, wherein first instruction comprises a first write command and the first operating parameter, wherein the second instruction comprises a second write command and the second operating parameter, wherein at least one of the number of threshold voltage values is different than at least one of the second threshold voltage values.

17. The memory system of claim 16, wherein the memory controller further:
   reads the first data from the first portion of the memory array in response to receiving a third instruction comprising a first read command and at least the first operating parameter; and
   reads the second data from the second portion of the memory array in response to receiving a fourth instruction comprising a second read command and at least the second operating parameter.

18. The memory system of claim 15, wherein the memory controller, subsequent to writing the first data to the first portion of the memory array using the first number of threshold voltage values, writes third data to the first portion of the memory array using the second number of threshold voltage values.

19. The memory system of claim 18, wherein the memory controller writes the third data to the first portion of the memory array in response to receiving a fifth instruction comprising a third write command and the at least the second operating parameter.

* * * * *